(12) United States Patent
Duffy et al.

(10) Patent No.: US 7,097,748 B2
(45) Date of Patent: Aug. 29, 2006

(54) ELECTROLYZER PRESSURE EQUALIZATION SYSTEM

(75) Inventors: John J. Duffy, Winchester, MA (US); Daniel Shapiro, Peterborough, NH (US)

(73) Assignee: University of Massachusetts, Lowell, MA (US)

( * ) Notice: Subject to any disclaimer, the term of this patent is extended or adjusted under 35 U.S.C. 154(b) by 217 days.

(21) Appl. No.: 10/421,668

(22) Filed: Apr. 23, 2003

(65) Prior Publication Data

US 2004/0072040 A1 Apr. 15, 2004

Related U.S. Application Data

(60) Provisional application No. 60/374,732, filed on Apr. 23, 2002.

(51) Int. Cl.
  *C25B 9/20* (2006.01)
  *H01M 8/06* (2006.01)
  *H01M 8/18* (2006.01)
  *C25B 1/08* (2006.01)
(52) U.S. Cl. .................. 204/237; 204/253; 429/21
(58) Field of Classification Search .................. None
See application file for complete search history.

(56) References Cited

U.S. PATENT DOCUMENTS

| | | | | |
|---|---|---|---|---|
| 2,582,885 | A * | 1/1952 | Rosenblatt | 423/219 |
| 3,507,704 | A | 4/1970 | Wilner et al. | 136/86 |
| 3,670,122 | A * | 6/1972 | Belart et al. | 200/82 D |
| 3,825,706 | A * | 7/1974 | Papiau | 200/82 D |
| 3,839,091 | A | 10/1974 | Bloomfield et al. | 136/86 |
| 4,513,066 | A | 4/1985 | Simon | 429/42 |
| 4,528,251 | A | 7/1985 | Yamaguchi et al. | 429/25 |

(Continued)

FOREIGN PATENT DOCUMENTS

DE 10258525 A1 * 7/2004

(Continued)

OTHER PUBLICATIONS

Smith, M.J.; "Fuel cell", in AccessScience@McGraw-Hill, http://www.accessscience.com, DOI 10.1036/1097-8542.YB990430, last modified: Apr. 10, 2000.*

*Primary Examiner*—Harry D Wilkins, III
(74) *Attorney, Agent, or Firm*—Weingarten, Schurgin, Gagnebin & Lebovici LLP

(57) ABSTRACT

An energy storage system has a first pressurized tank for carrying water and hydrogen gas and a second pressurized tank for carrying water and oxygen gas. A first output line connects to the pressurized tank for carrying hydrogen gas from the tank. A second output line connects to the second pressurized tank for carrying oxygen gas from the second tank. The energy storage system has a differential-pressure relief valve connected to the output lines to maintain the gases within a defined pressure differential. A water line connects to both pressurized tanks for maintaining relative water levels in the tanks. An electrolyzer is maintained under pressure and receives water from at least one of the pressurized tanks and creates hydrogen gas and oxygen gas for storage in the pressurized tanks. An accumulator connects to the output lines and having a movable diaphragm that separates the gases and moves to adjust volume to equalize pressure. A regeneration system having the energy storage system and a fuel cell for generating electrical energy is connected to the output lines. A catalyst hood overlies the electrolyzer. In a preferred embodiment of the regeneration system, both the electrolyzer and the fuel cell have a proton exchange membrane. A solar array is connected to the electrolyzer in the regeneration system.

26 Claims, 14 Drawing Sheets

U.S. PATENT DOCUMENTS

| | | | |
|---|---|---|---|
| 4,769,297 A | 9/1988 | Reiser et al. | 429/17 |
| 5,261,452 A * | 11/1993 | McAndrew et al. | 137/606 |
| 5,277,994 A | 1/1994 | Sprouse | 429/17 |
| 5,507,309 A * | 4/1996 | Dean | 137/87.03 |
| 5,512,145 A * | 4/1996 | Hollenberg | 205/628 |
| 5,607,784 A | 3/1997 | Jalan et al. | 429/16 |
| 5,690,797 A * | 11/1997 | Harada et al. | 204/228.5 |
| 5,783,051 A * | 7/1998 | Hirai et al. | 204/254 |
| 5,914,199 A * | 6/1999 | Carter et al. | 429/25 |
| 5,972,530 A | 10/1999 | Shelekhin et al. | 429/26 |
| 6,033,549 A * | 3/2000 | Peinecke et al. | 205/335 |
| 6,248,466 B1 | 6/2001 | Takahashi et al. | 429/38 |
| 6,329,098 B1 | 12/2001 | Bliesner | 429/103 |
| 6,576,096 B1 * | 6/2003 | Andrews et al. | 204/262 |
| 6,833,206 B1 * | 12/2004 | Erdle et al. | 429/17 |
| 6,861,167 B1 * | 3/2005 | Wells et al. | 429/13 |
| 2002/0015870 A1 | 2/2002 | Cownden et al. | 429/19 |
| 2002/0022165 A1 | 2/2002 | Brassard | 429/21 |
| 2002/0025467 A1 | 2/2002 | Staats, III | 429/30 |
| 2003/0141200 A1* | 7/2003 | Harada | 205/637 |

FOREIGN PATENT DOCUMENTS

| | | | |
|---|---|---|---|
| JP | 09-291386 A | * | 11/1997 |
| JP | 2000-054175 A | * | 2/2000 |
| WO | WO 2004055242 A1 | * | 7/2004 |

* cited by examiner

MEMBRANE ELECTRODE ASSEMBLY (MEA)

VOLTAGE RISE OF 4-CELL, 50 cm² ELECTROLYZER

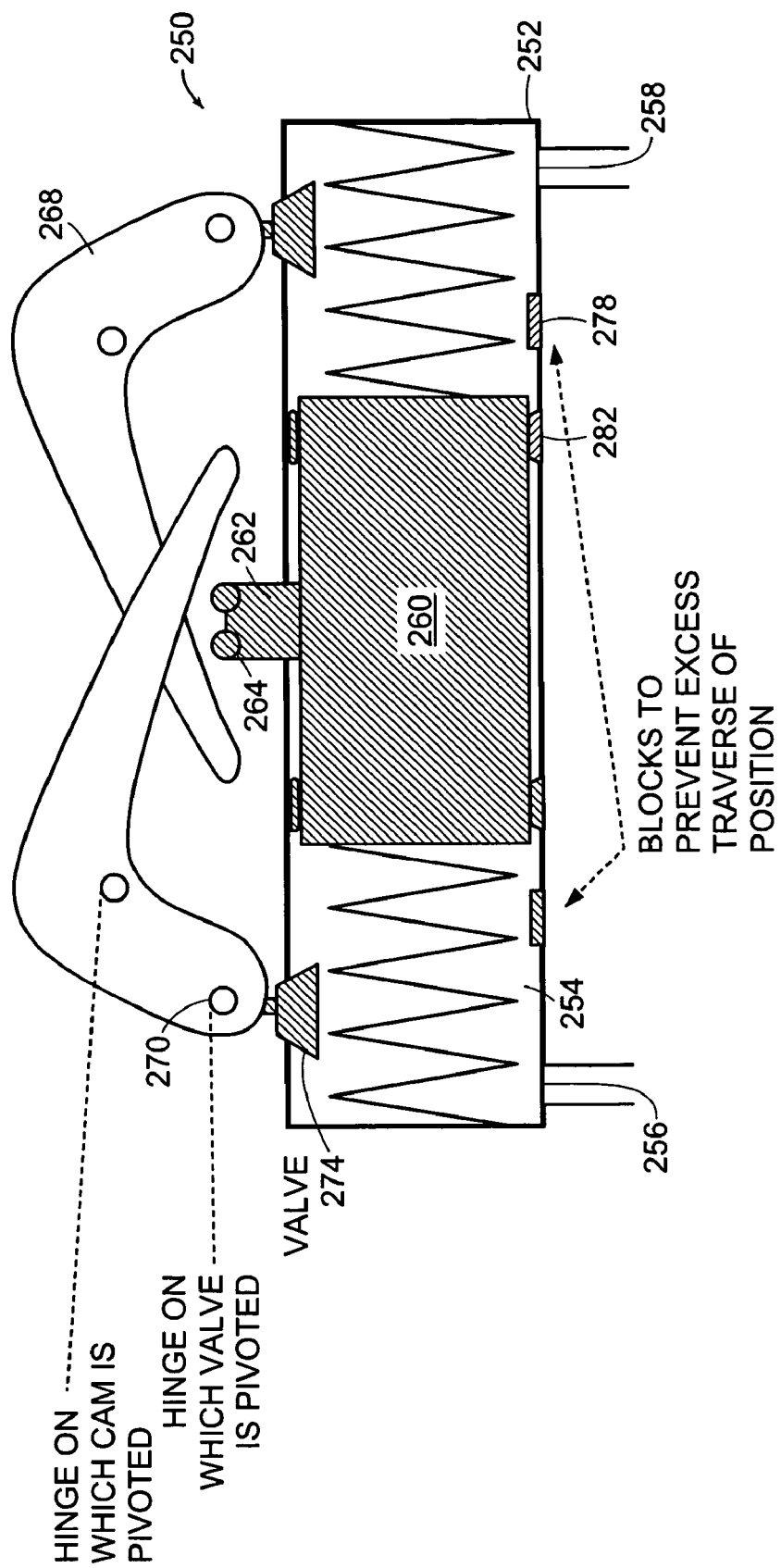
FIG. 12A SIDE VIEW

TOP VIEW

ELECTROLYZER PRESSURE EQUALIZATION SYSTEM

CROSS REFERENCES TO RELATED APPLICATIONS

The present application claims the benefit of U.S. Provisional Application No. 60/374,732, filed Apr. 23, 2002. The entire contents of the above application are incorporated herein by reference in entirety.

BACKGROUND OF THE INVENTION

There are billions of people on the earth who live without access to reliable electricity. Even a modest amount of electrical power can tremendously improve the quality of life for people in under-served regions. Basic applications in these rural areas could include items such as lighting, medical, and health related items such as refrigeration for medicines and food.

While the use of petroleum-based resources to generate electrical power is a possibility, petroleum-based resources have environmental issues, concerns as non-renewable resources, and the logistics of getting the petroleum-based resources from the source to the area of need. Renewable energy technologies including solar photovoltaic, solar thermal, geothermal, tidal, wind and others offer the hope of renewable resources local to the area needing power. In addition, these renewable energy technologies are inherently scalable and lend themselves to the potential of eliminating the need for a power grid. However, these renewable energy technologies generally need a storage mechanism to store energy in that they are not capable typically of varying output based on need. In addition, many of these technologies are cyclical in nature such as photovoltaic where the output from the energy source drops essentially to zero at night.

One method of storing the energy is a regenerative electrolyzer/fuel cell system. However, existing regenerative electrolyzer/fuel cell systems have several short-comings including the large size of storage tanks to hold sufficient gas for the fuel cell.

SUMMARY OF THE INVENTION

This invention relates to a regenerative electrolyzer/fuel cell system including an energy storage system. The storage system can hold at a relatively high pressure, such as 2000 PSI, the gases created and used. This allows a system that can store the same energy as existing battery technology within roughly the same volume.

The energy storage system has a pressurized tank for carrying water and hydrogen gas and a second pressurized tank for carrying water and oxygen gas. An output line connects to the first pressurized tank for carrying hydrogen gas from the tank. A second output line connects to the second pressurized tank for carrying oxygen gas from the second tank. The energy storage system has a differential-pressure relief valve connected to the output lines to maintain the gases within a defined pressure differential. A water line connects to both pressurized tanks for maintaining relative water levels in the tanks. An electrolyzer is maintained under pressure and receives water from at least one of the pressurized tanks and creates hydrogen gas and oxygen gas for storage in the pressurized tanks.

In an embodiment of the energy storage system, an accumulator is connected to the output lines and has a movable diaphragm that separates the gases and moves to adjust the volumes of the gases to equalize pressure.

In an embodiment, the energy storage system has at least one circulating pump carried by the water line for maintaining relative water levels in the tanks. In an alternative embodiment, the water is adjusted between the pressure tanks by natural flow.

In an embodiment, the electrolyzer of the system is retained in one of the pressurized tanks. In a preferred embodiment, the electrolyzer is retained in the pressurized tank that retains the hydrogen gas.

In an alternative embodiment, the system has a third pressurized tank. The third pressurized tank contains a third gas under pressure and the electrolyzer. The third pressurized tank is in pressure communication with one of the other pressurized tanks. In a preferred embodiment, the third gas is nitrogen. The pressure communication of the third pressurized tank with one of the other pressurized tanks is through an accumulator.

This invention relates to a regeneration system having a first pressurized tank for carrying water and hydrogen gas and a second pressurized tank for carrying water and oxygen gas. A first output line connects to the first pressurized tank for carrying hydrogen gas from the tank. A second output line connects to the second pressurized tank for carrying oxygen gas from the second tank. The system has a differential-pressure relief valve connected to the output lines to maintain the gases within a defined pressure differential. A water line connects to both pressurized tanks for maintaining relative water levels in the tanks. An electrolyzer is maintained under pressure and receives water from at least one of the pressurized tanks and creates hydrogen gas and oxygen gas for storage in the pressurized tanks. A fuel cell for generating electrical energy is connected to the output lines.

In an embodiment, a catalyst hood or bonnet overlies the electrolyzer. The catalyst recombines with any free oxygen in the hydrogen pressure tank in the regeneration system. The recombined oxygen forms water.

In a preferred embodiment of the regeneration system, both the electrolyzer and the fuel cell have a proton exchange membrane.

In one embodiment, a photovoltaic solar array is connected to the electrolyzer in the regeneration system. In another embodiment, the electrolyzer is connected to a wind power array.

This invention relates to a storage system for an electrolyzer. The storage system has a first pressurized tank for carrying water and hydrogen gas and a second pressurized tank for carrying water and oxygen gas. A first output line connects to the first pressurized tank for carrying hydrogen gas from the tank. A second output line connects to the second pressurized tank for carrying oxygen gas from the second tank. The storage system has a differential-pressure relief valve connecting to the output lines to maintain the gases within a defined pressure differential. A water line connects to both pressurized tanks for maintaining relative water levels in the tanks. The storage system has a mechanism for inputting hydrogen gas and oxygen gas under pressure for storage in the pressurized tanks.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 12A is a side sectional view of an alternative differential-pressure relief valve.

DETAILED DESCRIPTION OF THE INVENTION

Figure 1:
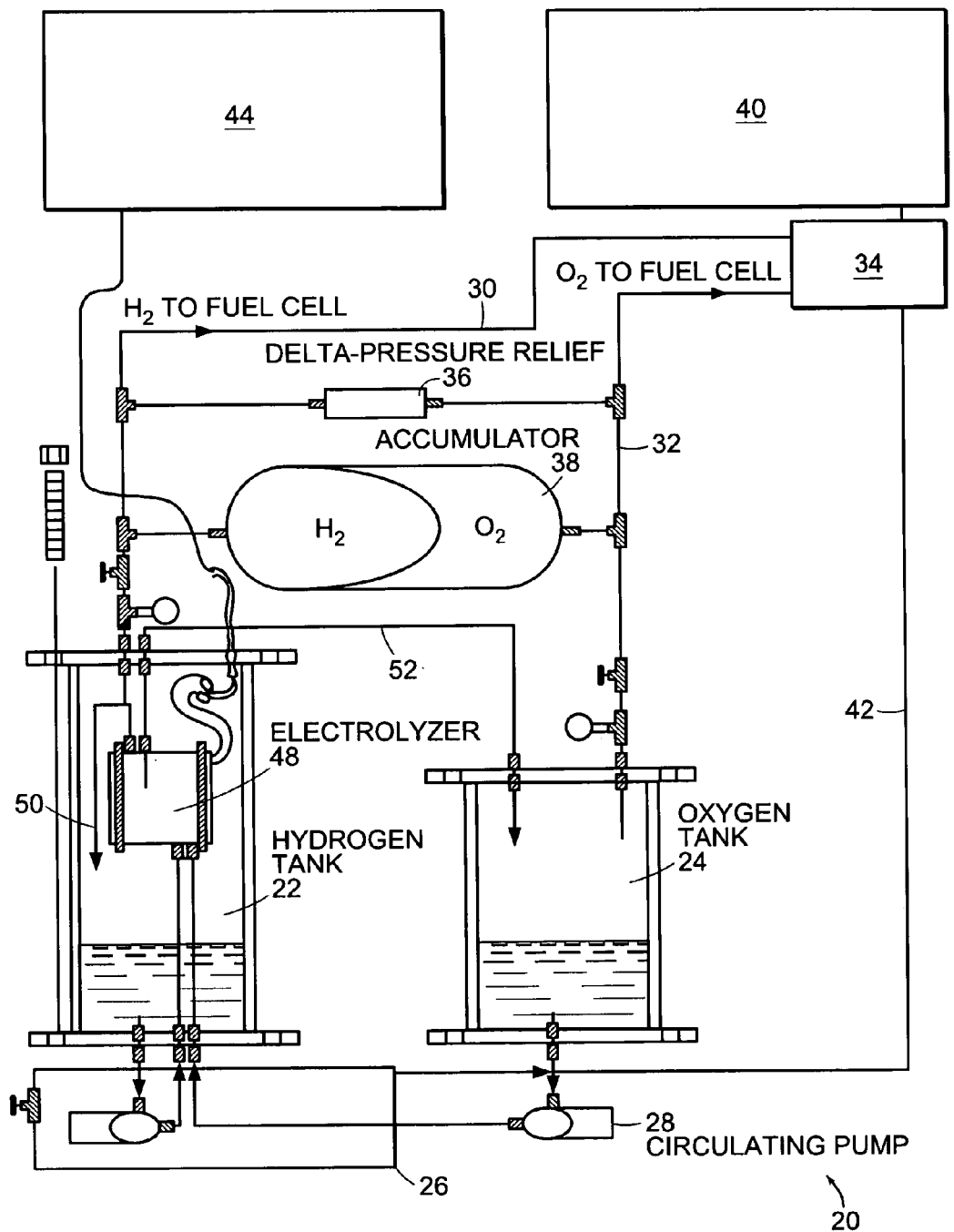
FIG. 1 is a schematic of a regenerative electrolyzer/fuel cell system.

Referring to FIG. 1, a regenerative electrolyzer/fuel cell system according to the invention is generally shown as 20. The system 20 has a first pressurized storage tank 22 for holding hydrogen gas, a second pressurized storage tank 24 containing oxygen gas. The first pressurized tank 22 and the second pressurized tank 24 in addition contain water. A water line 26 extends between the two pressurized tanks 22 and 24. A circulating pump 28 in an embodiment helps control the relative water levels.

The regenerative electrolyzer/fuel cell 20 has a pair of output lines 30 and 32 for carrying hydrogen gas and oxygen gas respectively to a fuel cell 34. Interposed between the output line 30 for the hydrogen gas and the output line 32 for the oxygen gas is a differential pressure relief valve 36 for maintaining the pressure within the hydrogen system and the oxygen system in close relationship. In addition, an accumulator 38 is interposed between the output line 30 for the hydrogen gas and the output line 32 for the oxygen gas for maintaining relatively equal pressures. The differential pressure relief valve 36 and the accumulator 38 are discussed in further detail below.

The fuel cell 34 converts the hydrogen gas that the fuel cell 34 receives through the output line 30 and the oxygen the fuel cell 34 receives from the output line 32 into electrical energy that can be used by various devices 40 such as electrical lighting, refrigeration systems, motors, and other known uses for electricity. In addition, the fuel cell 34 creates water as a byproduct. The water is carried along a water return line 42 to the pressurized tanks 22 and 24 via the water line 26.

The regenerative electrolyzer/fuel cell system 20 in addition has an energy source 44 such as a solar photo voltaic, solar thermal, geothermal, or other electrical generator 46 that creates an electrical current. This electrical current is sent to an electrolyzer 48. The electrolyzer 48 is carried within the first pressurized tank 22. The electrolyzer 48 uses the electricity to generate hydrogen gas and oxygen gas under pressure from the water. The hydrogen gas is piped from the electrolyzer 48 through a hydrogen line 50 to the hydrogen tank 22 and the oxygen is piped via an oxygen line 52 to the second pressurized tank 44.

In a preferred embodiment, the fuel cell 34 is a PEM (Proton-Exchange Membrane) fuel cell. In one embodiment, the fuel cell is one with the following properties such as one sold by Electro Chem, Inc., of Woburn, Mass. Such a PEM fuel cell will consume 7.55 $cm^3$/minute of hydrogen gas at Standard Temperature and Pressure (STP) to produce 1 Ampere of current at about 0.7 Volts. One-half that amount of oxygen gas will be consumed as well. For a system capable of producing 4 kW of electricity for 4 hours, if it were from a single cell (rather than a stack of cells, as in actual practice), the design goal of 4000 W power, divided by the single-cell operating voltage of 0.7 V, yields a required current of 5,714 A. At a current of 5,714 A, a 4 kW fuel cell would consume 43.14 liters of hydrogen per minute, or a total of 10,350 liters (at STP) over the 4-hour design operating time. The gases for the system are stored in high-pressure tanks 22 and 24 to minimize the overall system size. At the design maximum storage pressure of 2000 psi in this embodiment, the hydrogen supply for a full cycle (4 kW for 4 hours) would require a 76 L tank. The oxygen tank would then be one-half that size, or 38 L.

Figure 2A:
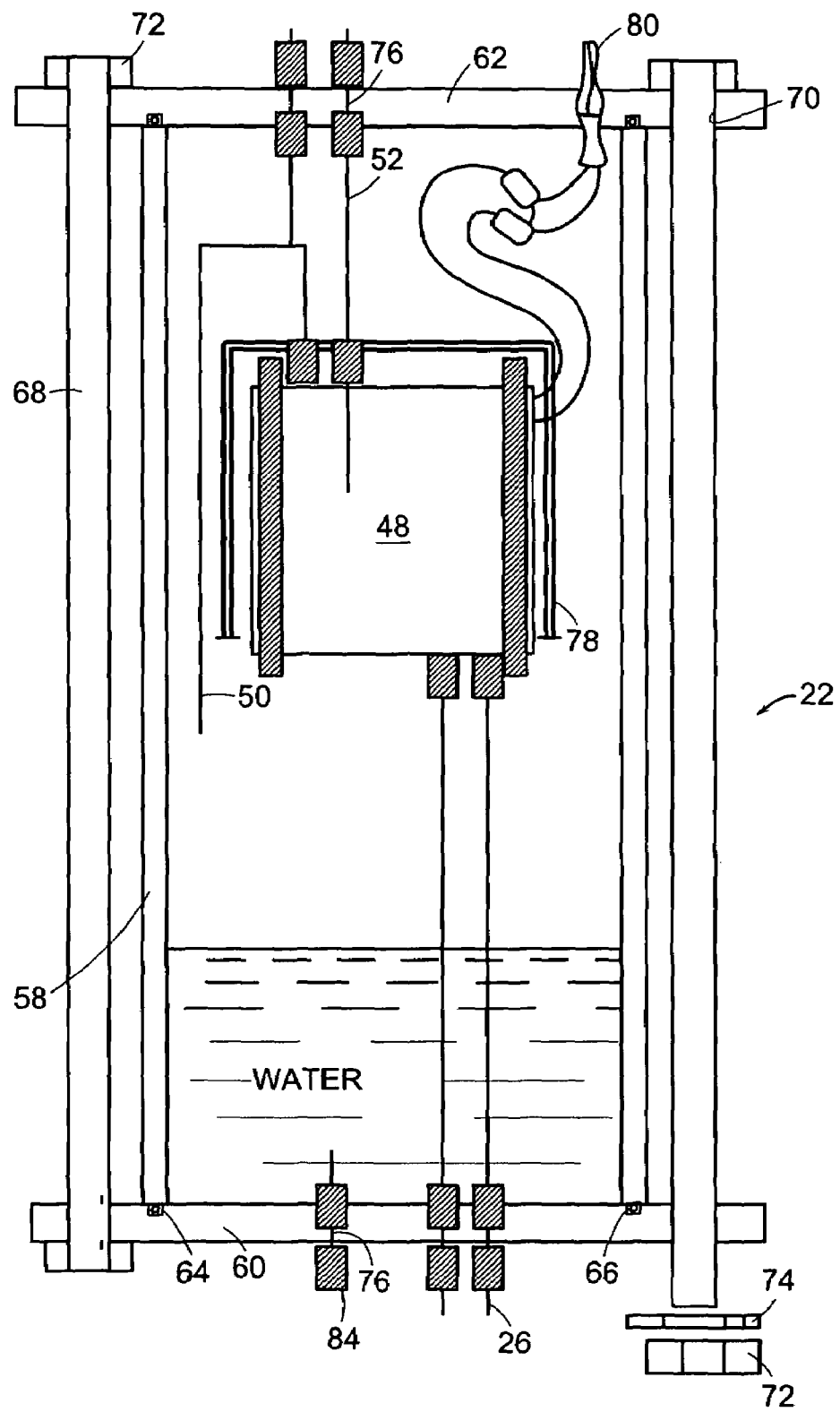
FIG. 2A is a sectional view of a pressurized tank for retaining hydrogen gas.

Referring to FIG. 2A, a sectional view of the first pressurized tank 22 is shown. The pressurized tank 22 has a pressure cylinder 58 and a pair of plates with a bottom plate 60 at one end and a top plate 62 at the other end. The plates 60 and 62 each have an annular groove 64 for receiving an O-ring 66 to seal the plates relative to the pressure cylinder 58. The plates 60 and 62 are retained against the pressure cylinder by a plurality of threaded bolts 68 that extend through holes 70 in the plates and are held in compression using nuts 72 and washers 74. In a preferred embodiment, all wetted surfaces are protected with a brush-on, corrosion-resistant epoxy coating.

In addition, the plates 60 and 62 of the pressure tank 22 have a plurality of ports 76 for passage of materials in and out of the pressurized tank 22 as explained in further detail below. The pressurized tank 22 in addition to containing hydrogen gas and water, retains the electrolyzer 48. The electrolyzer 48 is located within the pressurized tank 22 so that it is always maintained in the hydrogen gas portion of the tank.

A catalyst 78 formed as a bonnet on the hood encircles the electrolyzer 48. The purpose of the catalyst 78 is to recombine with free oxygen to create water. The electrolyzer 48 receives water by water lines 26 that extend through the ports 76 in the bottom plates 60. In the embodiment shown in FIG. 2A, the electrolyzer receives water via two water lines 26.

In the electrolyzer 48, water is pumped along both sides of the proton-exchange membrane, guided by flow channels in the plates separating the individual cells. To maintain efficiency, the proportion of gas to water in the flow channels should not exceed 1:1. Water flow must be sufficient to carry away gases as they are produced, so that gas bubbles do not occupy more than 50% of the flow field volume. In the embodiment of 4K Watts discussed above, for 4 hours of power, a recharge time of 40 hours or less was set as a design goal. Since the electrolyzer 48 recharge rate is to be 40 hours, or $\frac{1}{10}^{th}$ the fuel cell consumption rate, the electrolyzer 48 is expected to produce 4.3 L/minute of $H_2$ at STP. The minimum operating pressure will be about 64 psia, not atmospheric pressure, so this amounts to 979 mL or about 1 liter of $H_2$ at 64 psia. This figure, at the minimum operating pressure, represents the largest volume of gas to be produced per minute. An equal or greater amount of water must move through the flow field. To provide adequate margin, a pump flow rate from the circulating pumps 28, as seen in FIG. 1, of 2 liters/minute was selected.

In one embodiment, the water circulating pumps 28 for the electrolyzer 48 are stainless-steel bodied magnetic-drive gear pumps with Teflon gears. The pumps are rated 300 psi such as manufactured by Micropump, Inc. The pumps 28 are intended to be highly reliable, low flow, low head pumps for mildly corrosive fluids. The motors run on 24V DC, to facilitate the use of solar power to run the system.

Figure 2B:
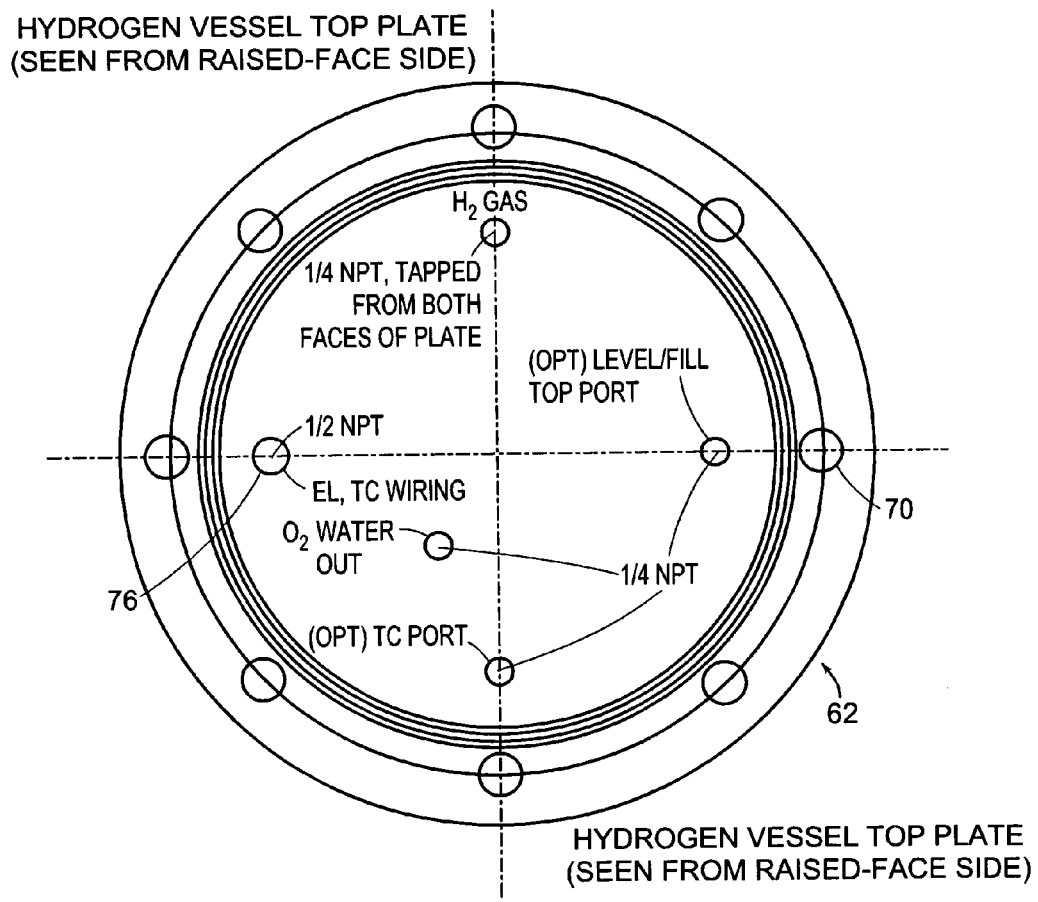
FIG. 2B is a front view of a top plate for the pressurized tank.

The electrolyzer 48 receives power from an electrical cord 80 that passes through one of the ports 76 in the top plate 62, as seen in FIG. 2A. FIG. 2B is a front view of the top plate 62 and shows the wiring. Referring back to FIG. 2A, in addition the electrolyzer 48 has two lines through which the gas is routed. The hydrogen gas is expended through the hydrogen line 50 and the oxygen is expended through the oxygen line 52. Both of these lines, 50 and 52 pass through the catalyst 78. In the embodiment shown, the hydrogen line has an opening within the pressurized tank 22. In addition, the hydrogen line has a junction connecting it to the output line 30 for routing hydrogen gas to the fuel cell 34. The oxygen line 52 extends through one of the ports 76 in the top plate 62 to open into the second pressurized tank 24 which retains oxygen gas as seen in FIG. 1.

In each of the ports 76, a sealing ring or fitting 84 is threaded into the plate from the top and from the bottom. Referring to FIG. 2B, the top view of the top plate 62 is shown.

Figure 3:
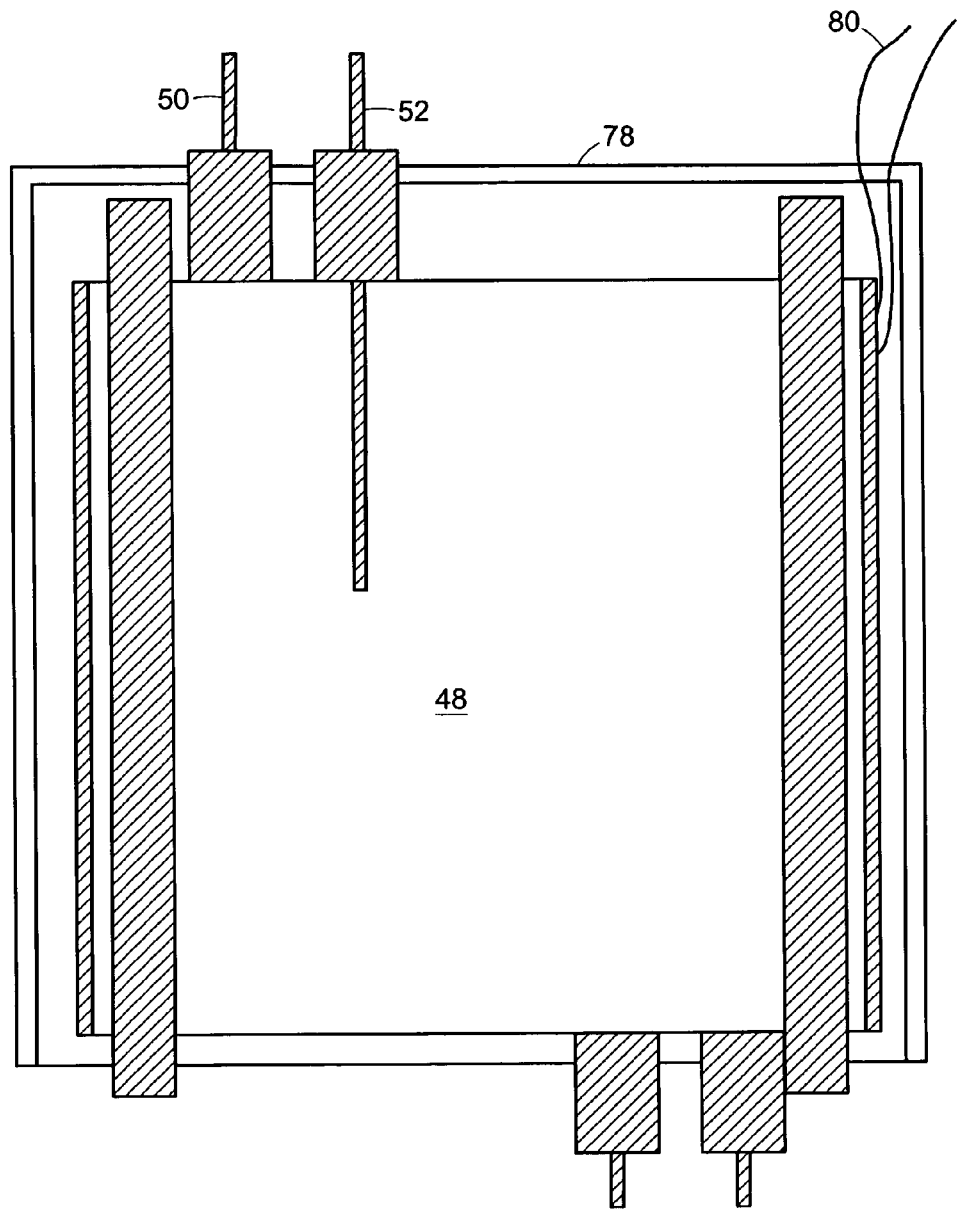
FIG. 3 is an enlarged sectional view of the electrolyzer with a catalyst bonnet.

FIG. 3 shows the electrolyzer 48 with a catalyst bonnet 78 encircling the electrolyzer in an enlarged sectional view. The electrolyzer 48 receives electricity via an electrical cord 80 which extends through the catalyst bonnet 78. The electrolyzer 48 takes the water it receives via water lines 26 and converts the water into oxygen and hydrogen under pressure. The hydrogen and oxygen are sent under pressure via the hydrogen line 50 and the oxygen line 52 to the respective pressurized tanks 22 and 24 shown in FIG. 1. To address the possibility of an oxygen leak within the hydrogen vessel, the catalyst-treated hood or bonnet 78 is placed around the electrolyzer 48. Any escaping oxygen would immediately recombine on the catalyzed surface with the ambient hydrogen, forming water. This spontaneous reaction is the same as takes place in a PEM fuel cell that is addressed below.

In a preferred embodiment, the electrolyzer is a filter-press style stack of individual electrolytic cells, capped with stiff endplates and held together with compression bolts around the perimeter. This design of the electrolyzer 48 is intended for use in free atmosphere at moderate internal pressures, up to about 50 psig (345 kPa). Above this pressure, leakage from the seals between the cells is expected to be significant. Similarly, if the ambient pressure were much greater than the internal pressure, the stack would leak. To operate successfully at high pressure, therefore, the electrolyzer's seals must not experience a large differential pressure between the internal flow fields and the stack's environment.

The placing of the electrolyzer 48 in the pressurized tank 22 allows the electrolyzer's ambient pressure to be matched continuously with that of the fluid within the electrolyzer 48, entirely eliminating pressure differences across the seals. As the system pressure changes (and thus the pressure of the electrolyzer's working fluid), the electrolyzer's ambient pressure is of necessity equal to its internal pressure. In addition, the regenerative electrolyzer/fuel cell system 20 reduces the number of fittings and components exposed to the difference between the system and room pressure. In addition, as seen in FIGS. 1 and 2A, tubing and connections for hydrogen gas and hydrogen-side water transport are reduced or eliminated.

The PEM fuel cell 34 and the electrolyzer 48 produce and consume hydrogen and oxygen in the same proportion that those elements are present in the water, 2:1. So for every mole of $H_2$ processed, one mole of the $H_2O$ will be involved. In the embodiment described above for a 4K Watt system, about 462 moles of $H_2$ are produced and consumed in a cycle, the same number of moles of $H_2O$ will be involved. During a full cycle of power production, the fuel cell will produce about 8.3 L of water. During recharging, the electrolyzer will consume the same amount.

Figure 4A:
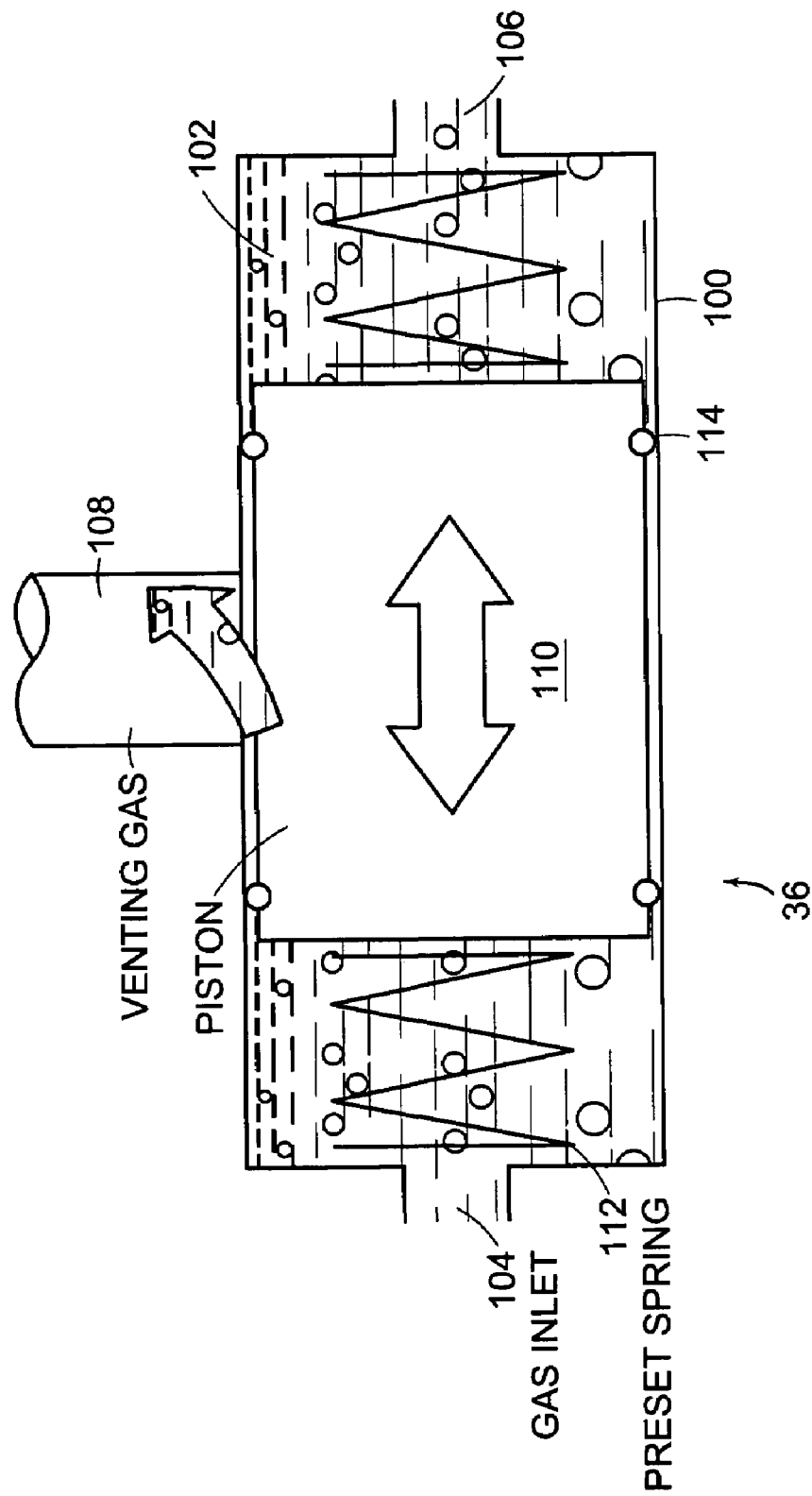
FIG. 4A is a sectional view of a differential-pressure relief valve.

FIG. 4A shows a sectional view of the differential pressure relief valve 36. The differential pressure relief valve 36 has a housing 100 defining a chamber 102 having an inlet 104 for receiving hydrogen gas from the output line 30 containing hydrogen gas and having a second port 106 connected to the output line 32 for receiving oxygen. The housing 100 of the differential pressure relief valve 36 has a venting port 108. The differential pressure relief valve 36 has a piston 110 which moves within the chamber 102. The piston 110 has a pair of sealing rings 114 for sealing with the housing. The piston is sized such that depending on the placement of the piston 110 in the chamber 102 of the housing 100, either one of the ports or 104 and 106 is in communication with the venting port 108 or neither are. In addition, the differential pressure relief valve 36 has a pair of preset springs 112 for positioning the differential pressure relief.

Large or sustained pressure imbalances between the oxygen and hydrogen sides are avoided with the differential pressure relief valve 36. Excessive pressure from either side causes the piston 110 to move to one side, allowing the higher-pressure gas an avenue to escape. After sufficient gas has escaped, the piston 110 moves back into a central position, again sealing the system.

Figure 4B:
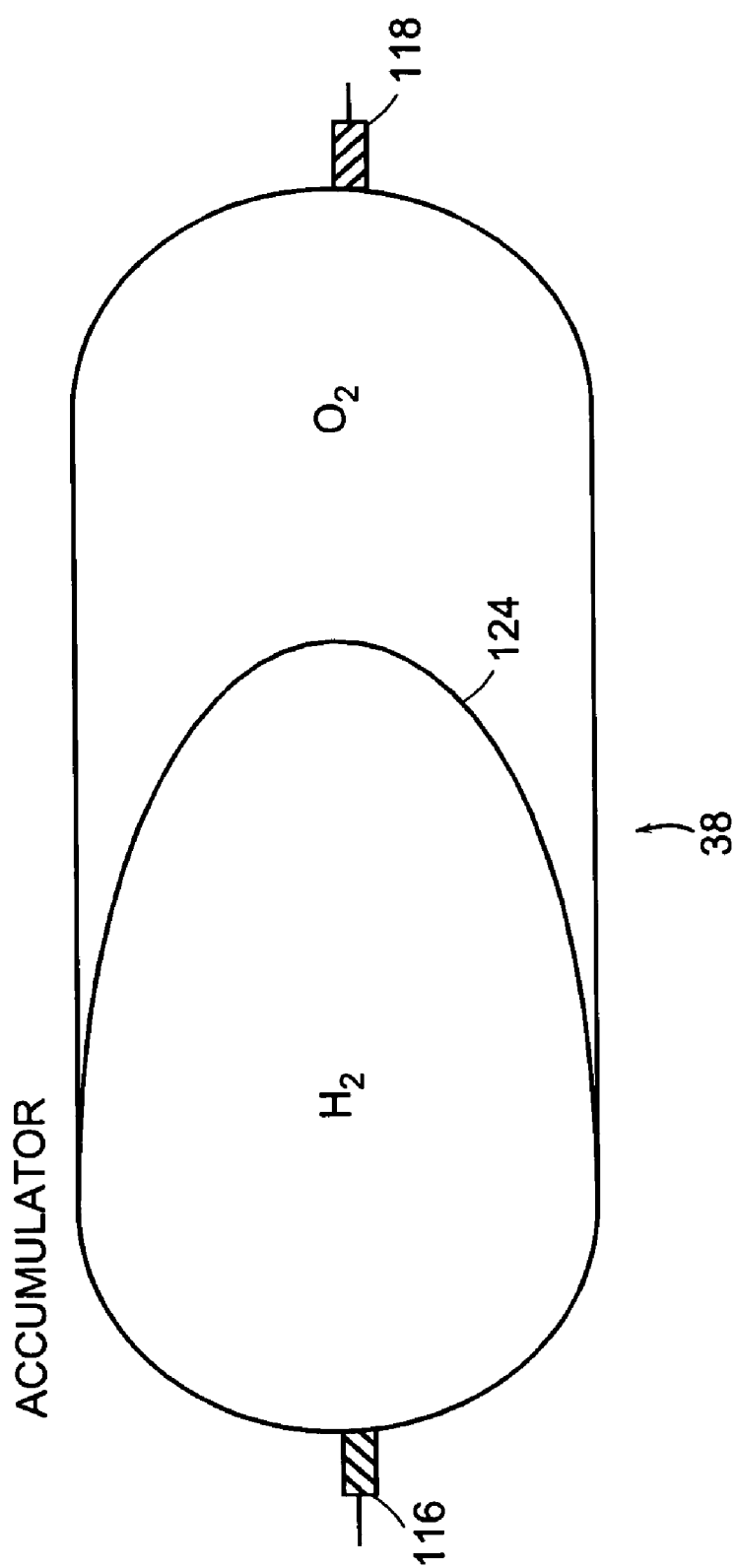
FIG. 4B is a sectional view of an accumulator.

Referring to FIG. 4B, the accumulator 38 of the regenerative electrolyzer/fuel cell system 20 has a port 116 that connects to the output line 30 containing hydrogen gas and a second port 118 that connects to the output line 32 containing oxygen gas. The accumulator 38 is a cylindrical container having a diaphragm 124 that is connected to the housing of the accumulator. The diaphragm 124 separates the hydrogen gas from the oxygen gas and is capable of shifting relative positions to change the relative volume of the respective gases. By varying the volume of the gases to each other, the pressure can be adjusted.

In one embodiment, the accumulator 38 is a hydraulic accumulator to provide a transfer barrier, pressure-damping interface between the hydrogen and oxygen volumes. The accumulator 38 is a steel shell containing the diaphragm or flexible bladder 124. The bladder 124 volume is connected to the system's hydrogen side, while the shell is connected to the oxygen side. The accumulator acts as a gas damper, minimizing the magnitude of any pressure surges in the system.

Figure 5:
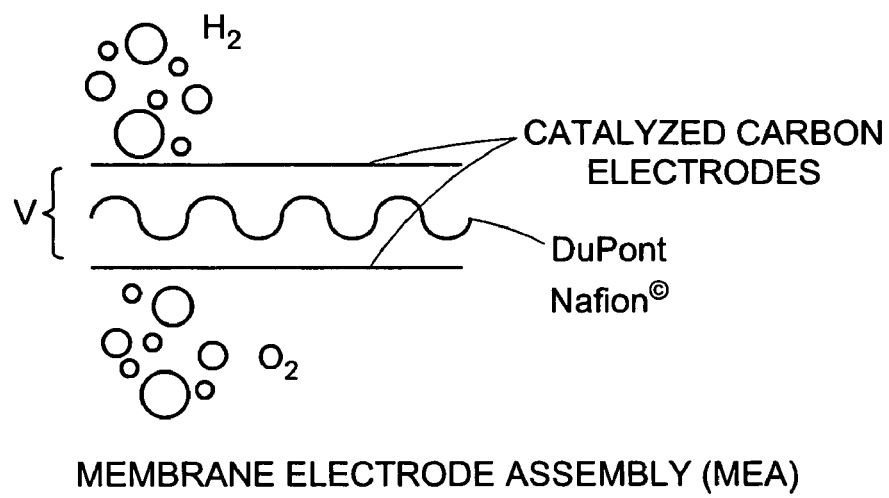
FIG. 5 is a schematic of a membrane electrode assembly.

The accumulator 38 is used to minimize any pressure differences within the electrolyzer itself. The core of a PEM device (fuel cell or electrolyzer) is the thin, flexible proton-exchange membrane itself, usually laminated between catalyzed carbon electrodes. It separates the hydrogen side of the system from the oxygen side. This membrane electrode assembly, as seen in FIG. 5, is relatively fragile; undue stress could compromise the intimate bond between membrane and electrodes or even result in a partial or complete rupture, with consequences ranging from impaired system performance to uncontrolled mixing of $H_2$ and $O_2$. The accumulator 38 prevents transient pressure surges, such as might be caused by automated valve actuation, from being transmitted to the membrane electrode assembly (MEA).

In addition, the accumulator 38 assists in the compensation for imbalance in water distribution. Under normal operation, water is consumed only on the oxygen side of the system, creating a volume imbalance. Compounding the problem, each proton migrating through the membrane osmotically "pulls" between 1 and 2.5 water molecules along with it to the hydrogen side of the system. Thus for each $H_2O$ molecule produced by the electrolyzer, the oxygen side loses 3 to 6 molecules of $H_2O$, while the hydrogen side gains 2 to 5 $H_2O$ molecules. This cumulative imbalance limits the electrolyzer's maximum run time in two ways: first, at some point the oxygen side will run out of water, and second, the mounting pressure imbalance will endanger the electrolyzer. For example in the 4 KW example, during a full 4-hour cycle, about 50 liters (=4*8.3 L) of water move from the oxygen-releasing side of the electrolyzer to the hydrogen-releasing side. This represents a challenge in mass-balancing design, which is discussed below.

By allowing the relative volume change between the two gases needed to equalize their pressures, the accumulator 38 extends system run time between cycles, and permits operation even under conditions where a system problem such as a slow oxygen leak creates improper proportions of oxygen and hydrogen.

In operation, each of the pressurized tanks 22 and 24 contains both gas and water. Water is pumped from each tank 22 and 24 into ports through the bottom plate 60 in the bottom of the electrolyzer 48 in the first pressurized tank 22, as shown in FIG. 1. Water, mixed with hydrogen or oxygen, exits the upper ports of the electrolyzer 48. The hydrogenated water is released directly into the water reservoir in the hydrogen tank, the first pressurized tank 22. Oxygenated water is conveyed to the oxygen tank, the second pressurized tank 24 by the oxygen line 52. Each tank 22 and 24 will contain a saturated mixture of gas and water; when gas is drawn off to be used by the fuel cell 34, it will be humid. The use of the humid gas is desired and appropriate in that the fuel cell's 34 membranes need to stay moist.

The accumulator 38 is placed effectively in parallel across the electrolyzer 48. One side of the accumulator 38 is connected to the hydrogen tank 22, the other side of the accumulator 38 is connected to the oxygen tank 24 by the respective lines 30 and 32. In this way, as the amount of gas in each side of the system changes, the relative volume occupied by each gas inside the accumulator 38 can shift, absorbing differences up to a point. The differential-pressure relief valve 36 is also placed in parallel as a backup.

To accommodate the accumulation of water in the hydrogen tank, the first pressure tank 22, due to a transport across the membrane of the electrolyzer 48, the regenerative electrolyzer/fuel cell system 20 is equipped with a valved bypass loop. When the water level in the two tanks 22 and 24 becomes too imbalanced, a valve can be opened and water will flow by gravitated feed to the oxygen tank. In the alternative, the bypass can be routed through one of the circulating pumps 28. Electrolysis would be halted, two valves operated, and the water would be pumped back to balanced levels.

Figure 6:
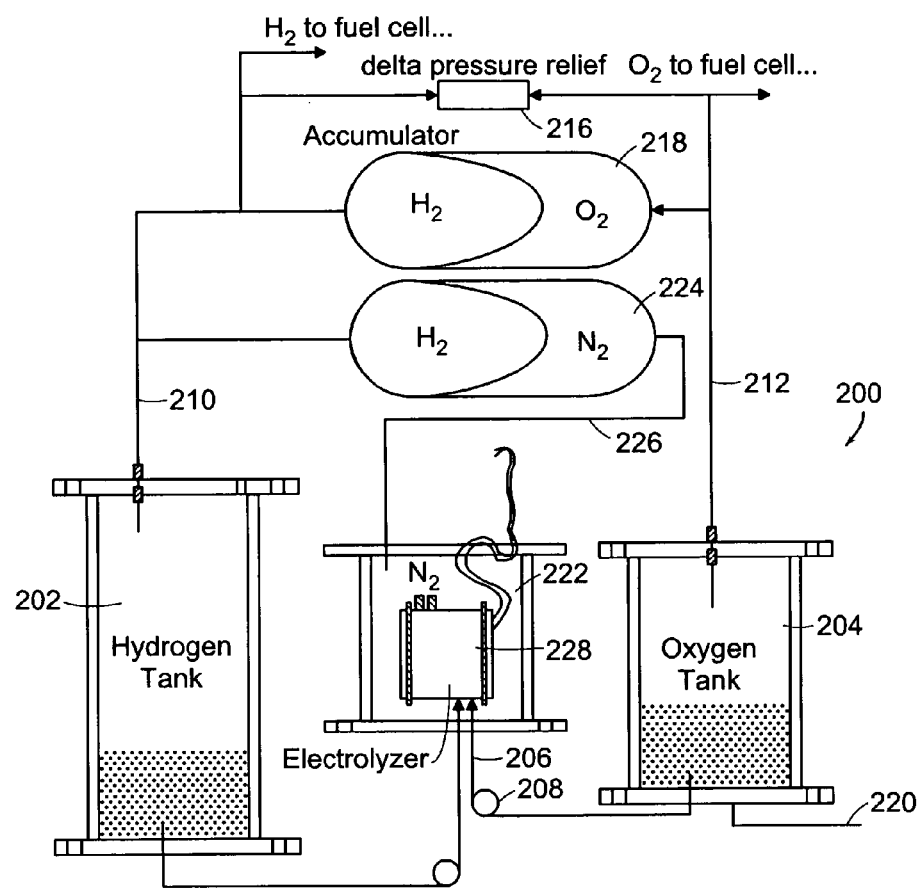
FIG. 6 is a schematic of an alternative regeneration electrolyzer fuel cell system.

An alternative regenerative electrolyzer/fuel cell system 200 is shown in FIG. 6. The regenerative electrolyzer fuel cell system 200 has a first pressurized tank 202 and a second pressurized tank 204 for retaining the hydrogen gas and the oxygen gas respectively. In addition, similar to the embodiments shown in previous figures, the system 200 has water lines 206 with a circulation pump 208. The hydrogen gas and oxygen gas are allotted from the respective pressurized tanks 202 and 204 by output lines 210 and 212. The system 200 has a differential pressure relief valve 216 and an accumulator 218. The output lines 210 and 212 are connected to a fuel cell, not shown in this figure. In addition, a water return line 220 takes the water from the fuel cell and returns it to the first and second pressurized tanks 202 and 204. In addition, the regenerative electrolyzer/fuel cell system 200 has a third pressurized tank 222 which retains the electrolyzer 228. The third pressurized tank 222 has a line 226 which sends nitrogen gas from a second accumulator 224. This second accumulator has a diaphragm similar to that described in the first embodiment with respect to FIG. 5. However, in contrast to the previous embodiment, the second accumulator has nitrogen gas and in the third pressurized tank 222 that extends through the line 226 to the one side of the accumulator 224. The second accumulator is connected on the other side to the output line 210 which contains hydrogen.

Figure 7:
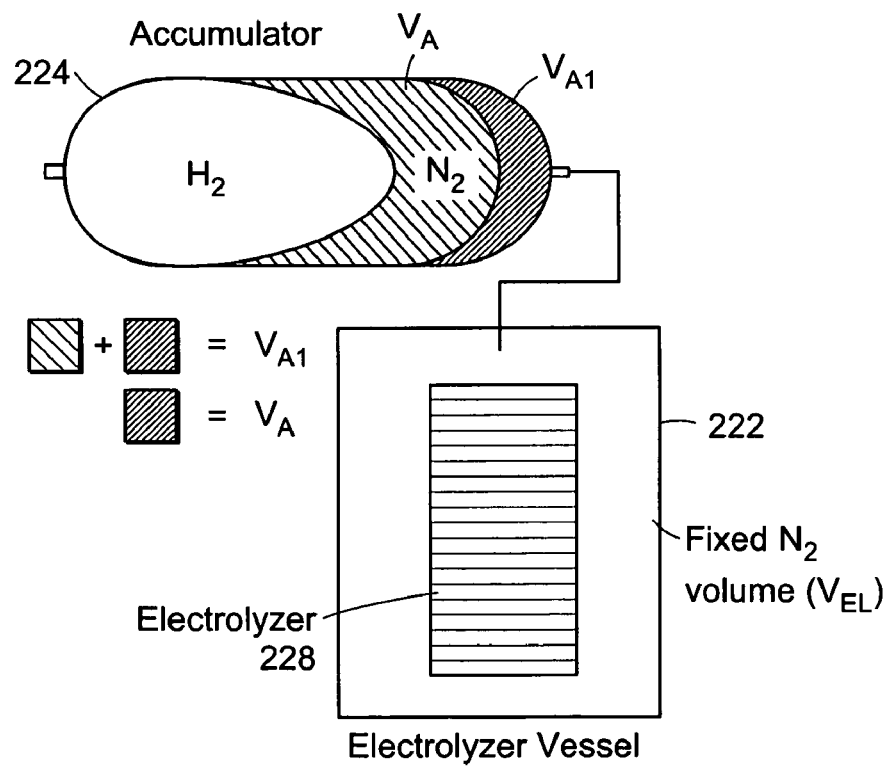
FIG. 7 is a sectional view of a pressurized tank and an accumulator of FIG. 6.

FIG. 7 is an enlarged view showing the second accumulator 224 and the third pressurized tank 222 with the electrolyzer 228. This is an alternative to placing the electrolyzer in a hydrogen atmosphere. The electrolyzer is placed in its own, dedicated pressure vessel 222, which will be filled with nitrogen. This vessel 222 is linked via a hydraulic accumulator 224 to the hydrogen-tank pressure, the first pressurized tank 202. When $H_2$ pressure increases, the hydrogen occupying the accumulator bladder will expand, pushing the nitrogen out of the accumulator's shell volume. This nitrogen will be forced into the fixed volume of the electrolyzer vessel, the third pressurized tank 222, compressing it. The ratio of fixed nitrogen volume (the unvarying volume of the connecting tubes and electrolyzer vessel) to the variable nitrogen volume (available volume inside the accumulator shell) must be as small as possible to allow the nitrogen to be compressed to match an acceptable range of hydrogen pressures.

In one embodiment, the second accumulator 224 has an internal volume of 58 cubic inches. The total fixed nitrogen can only be 18 cubic inches to maintain volume hydrogen pressure ranging from 50 to 200 psig. A larger accumulator allows for a larger third pressurized tank 222, but even then, achieving high nitrogen pressure ratios will require strict limitations on fixed nitrogen volume. For example, to cover the range of 50–2000 psi (40-fold pressure increase) given a 1-gallon (232 $in^3$) accumulator, no more than 5 cubic inches of fixed nitrogen volume could be allowed. These calculations assume that nitrogen occupies most or all of the accumulator volume at low system pressures, and that hydrogen occupies the entire volume at the highest system pressures.

A test was performed. The results show that pressure-balancing across the electrolyzer seals was successfully demonstrated. The electrolyzer stack, designed for 50 psig (345 kPa) use, was operated up to 220 psig (1517 kPa) internal pressure with no evidence of hydrogen or oxygen leakage.

Figure 8:
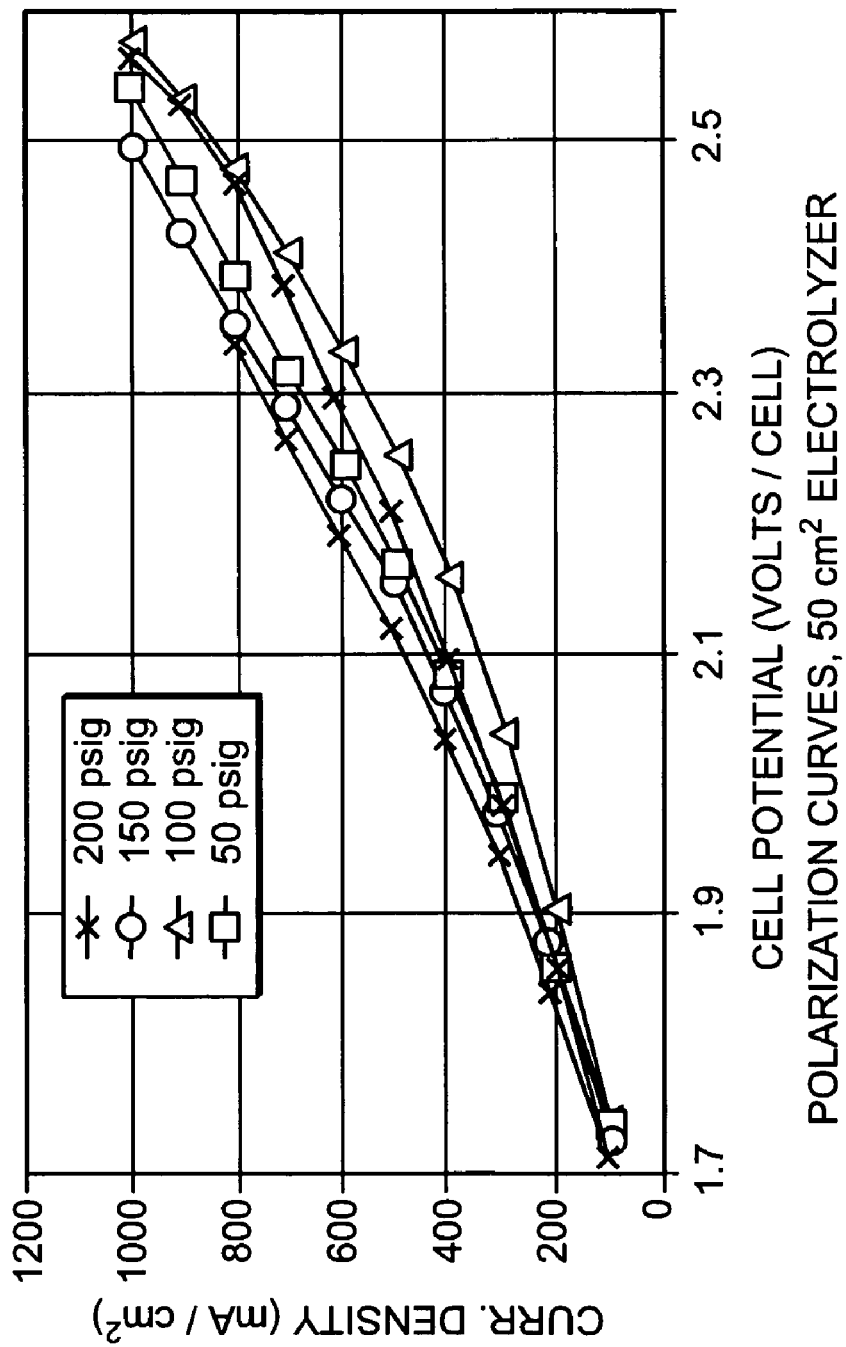
FIG. 8 is a graph of polarization curves.

The electrolyzer 48 was tested up to its target current density of 1.0 amp/$cm^2$ at a range of pressures. At that current level, cell voltage averaged 2.5 volts, well above the ideal but approaching the voltage expected from this prototype as seen in FIG. 8.

It is known that an electrolyzer can generate gas at high pressure with little more energy than required at low pressure. It appears that the "missing energy" is drawn from the stack overvoltage, the amount by which the cells' voltages exceed the thermodynamic ideal minimum voltage of 1.23 V, and that the electrolyzer just becomes less inefficient as the pressure rises. The Nernst Equation (Equation 1) is often used to describe how the ideal cell potential varies with the concentrations of the products and reactants.

$$E = E^0 - \frac{RT}{nF} \ln \frac{|C_{prod}|}{|C_{react}|}$$ (Equation 1)

Here the products are pure $H_2$ and $O_2$ gas, and their concentration may be taken as their pressure. If the product gas pressure increases by a given factor X, the ideal cell potential increases by the amount $(RT/2F)*\ln(X^{3/2})$.

Figure 9:
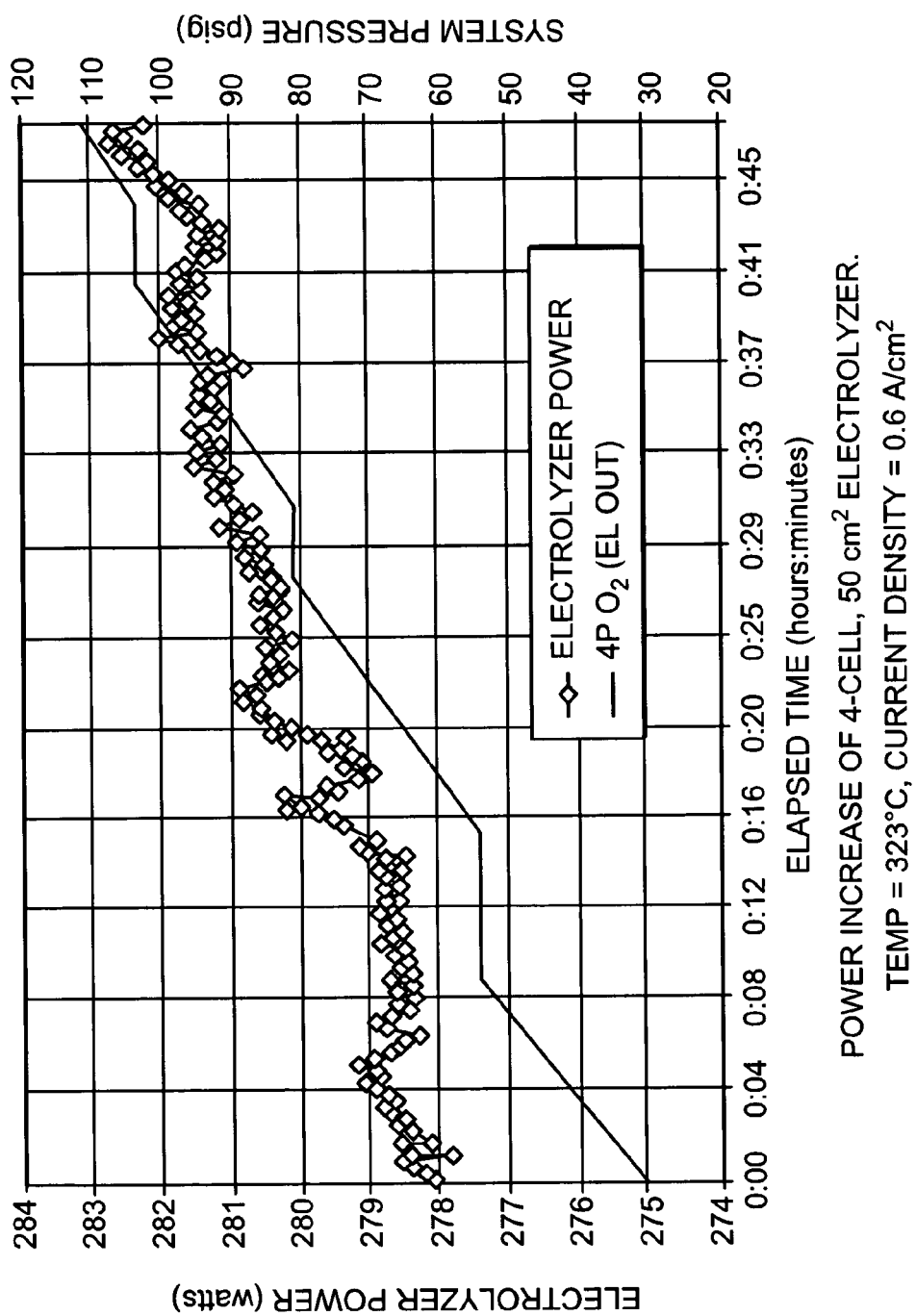
FIG. 9 is a graph of electrolyzer power and system pressure relative to time.

In one stepwise constant-pressure test, the electrolyzer generated enough gas to raise the system pressure from 32 to 110 psig (221 to 758 kPa) as seen in FIG. 9. The measured power demand rose minimally, from 278.1 W to 282.2 W, or an increase of only 1.5%. This type of result has been verified in multiple tests, up to 210 psig (1448 kPa).

Figure 10:
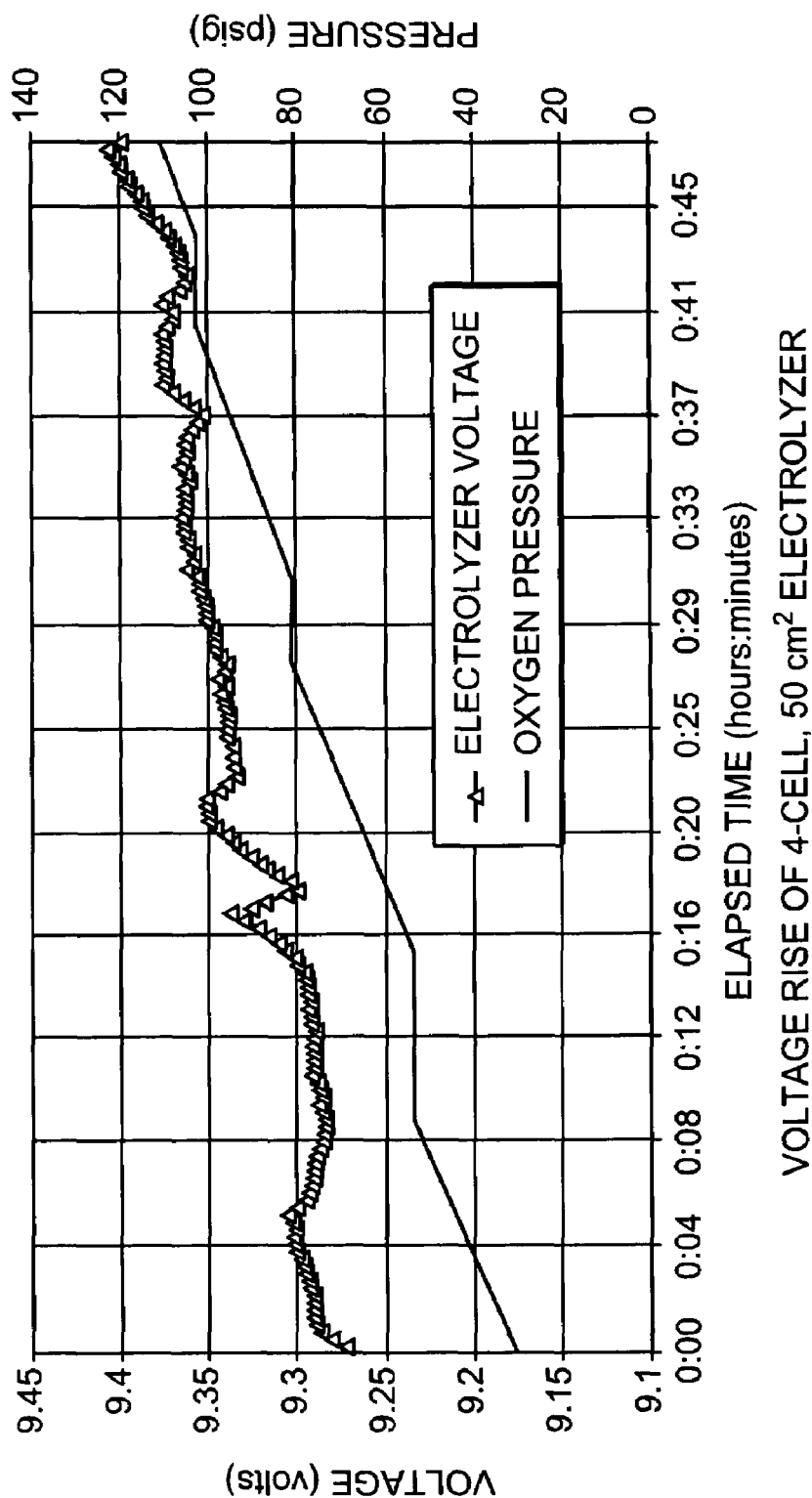
FIG. 10 is a graph of voltage rise of the electrolyzer and oxygen pressure relative to time.

During this test, the electrolyzer showed a voltage rise significantly greater than the ideal as shown in Table 1 and FIG. 10.

TABLE 1

Pressure and Voltage Rise, Ideal vs. Actual

| Press. Factor X | Ideal ΔV, mV | Actual ΔV, mV |
|---|---|---|
| 2.67 | 20.5 | 32 |

Figure 11:
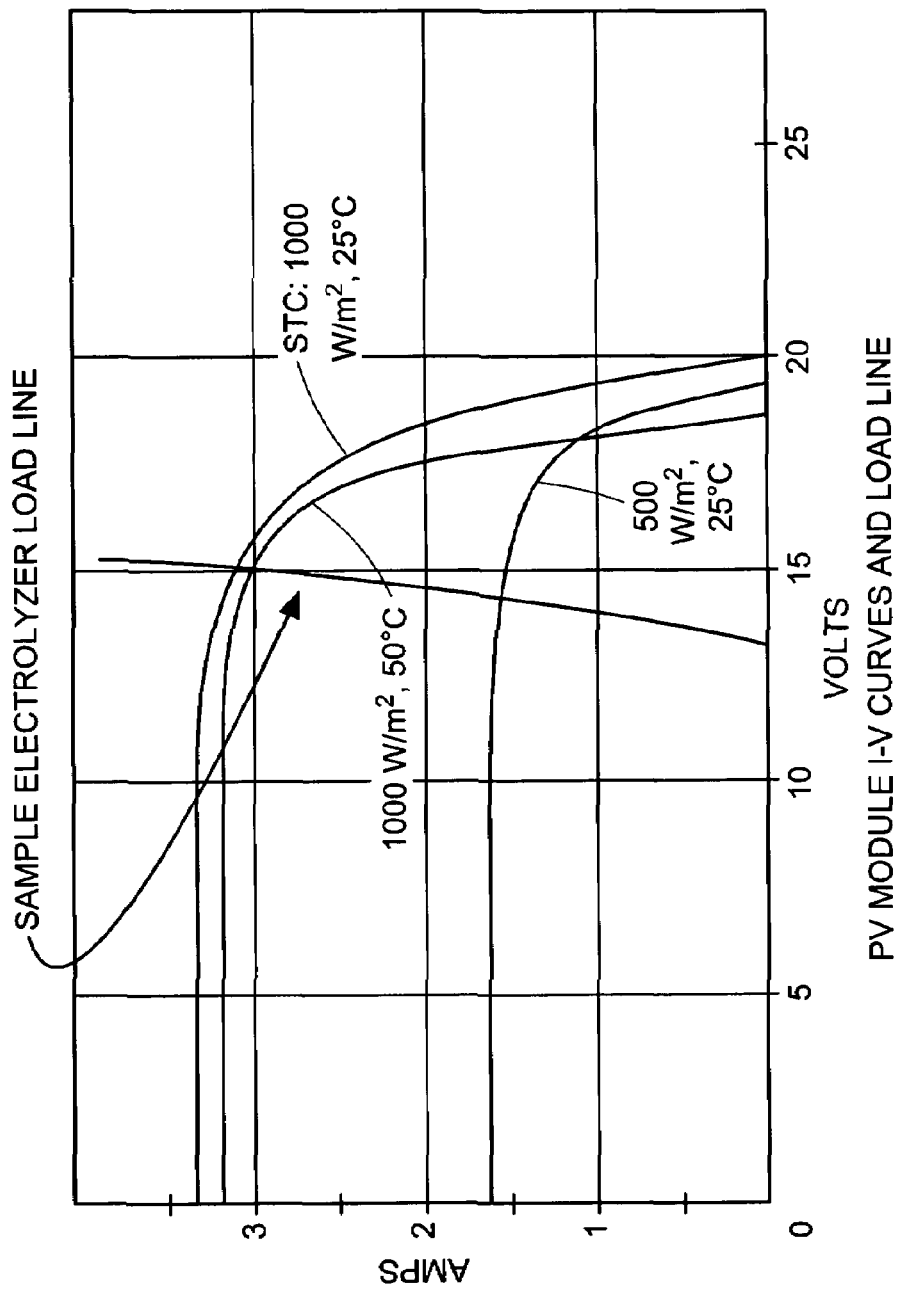
FIG. 11 is a graph of photovoltaic (PV) Module I-V curves and load line.

FIG. 11 illustrates conceptually the very favorable match between the PEM electrolyzer's load characteristics and the maximum power points of typical photo voltaic (PV) modules. The "sample electrolyzer load line" is from actual test data, and is superimposed upon a set of current-voltage curves from a typical commercial PV module, such as an ASE Americas ASE-50. Since the electrolyzer stack is modular, at approximately 2V per cell, an array of PV modules and an electrolyzer can be custom fit to each other.

Figure 12B:
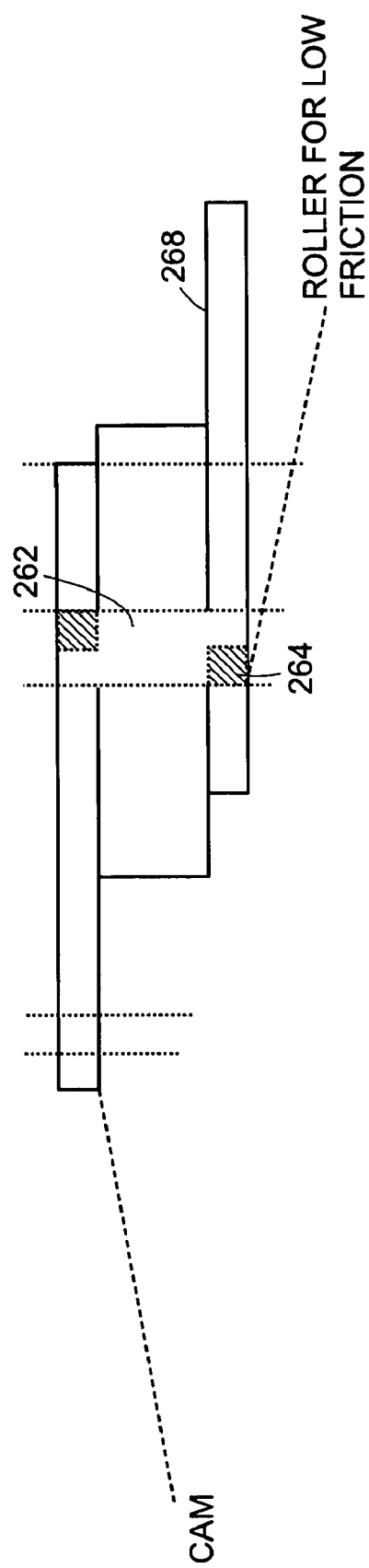
FIG. 12B is a top schematic view of the alternative differential-pressure relief valve of FIG. 12A.

An alternative differential pressure relief valve 250 is shown in FIGS. 12A and 12B. The differential pressure relief valve 250 has a housing 252 defining a chamber 254 having a first inlet or port 256 for receiving hydrogen gas from the output line 30 containing hydrogen gas and having a second port 258 connected to the output line 32 for receiving oxygen.

The relief valve 250 has a piston 260 that travels in the housing 252. A projection 262 with a plurality of rollers 264 is carried by the piston 260. Higher pressure on one side of the piston 260 forces the piston 260 to travel in the low-pressure direction. Beyond a pre-decided deadband distance, one of the rollers 264 make contact with a cam 268 for the high-pressure side, rotating the cam 268 about a hinge 270 for the cam 268 such that gas from the high-pressure side is released through a valve 274 decreasing the pressure. As pressure decreases, the cam 268 is returned to its original position because of the reduced pressure of the gas and a bias spring. Excess traverse of the piston 260 is prevented by at least one piston-blocks 278 placed inside the housing or tube 252.

In addition, the differential pressure relief valve 250 has a pair of preset springs 284 for positioning the differential pressure relief.

In contrast to the embodiment shown in FIG. 4A, the differential pressure relief valve 250 does not involve the passage of the O-ring 282 sealant over any perforation such as the venting port 108 of FIG. 4A.

The claims should not be read as limited to the described order or elements unless stated to that effect. Therefore, all embodiments that come within the scope and spirit of the following claims and equivalents thereto are claimed as the invention.

What is claimed:

1. An energy storage system comprising:
    a first pressurized tank for carrying water and hydrogen gas;
    a second pressurized tank for carrying water and oxygen gas;
    a first output line connected to the first pressurized tank for carrying hydrogen gas from the tank;
    a second output line connected to the second pressurized tank for carrying oxygen gas from the second tank;
    a differential-pressure relief valve connected to the output lines to maintain the gases within a defined pressure differential;
    a water line connected to both pressurized tanks for maintaining relative water levels in the tanks;
    an electrolyzer maintained under pressure and receiving water from at least one of the pressurized tanks and producing hydrogen gas and oxygen gas for storage in the pressurized tanks; and
    a fuel cell that receives hydrogen through the first output line and that receives oxygen through the second output line.

2. The energy storage system of claim 1 further comprising an accumulator connected to the output lines and having a movable diaphragm that separates the gases and moves to adjust volume to equalize pressure.

3. The energy storage system of claim 1 further comprising at least one circulating pump carried on the water line for maintaining relative water levels in the tanks.

4. The energy storage system of claim 1 wherein the water is adjusted between the pressure tanks by natural flow.

5. The energy storage system of claim 1 wherein the electrolyzer is retained in one of the pressurized tanks.

6. The energy storage system of claim 5 wherein the electrolyzer is retained in the pressurized tank that retains the hydrogen.

7. The energy storage system of claim 1 further comprises a third pressurized tank, the third pressurized tank containing a third gas and the electrolyzer; and the third pressurized tank is in pressure communication with one of the other pressurized tanks.

8. The energy storage system of claim 7 wherein the third gas is nitrogen.

9. The energy storage system of claim 7 wherein the pressure communication of the third pressurized tank with one of the other pressurized tanks is through an accumulator.

10. A regeneration system comprising:
    a first pressurized tank for carrying water and hydrogen gas;
    a second pressurized tank for carrying water and oxygen gas;

a first output line connected to the pressurized tank for carrying hydrogen gas from the tank;

a second output line connected to the second pressurized tank for carrying oxygen gas from the second tank;

a differential-pressure relief valve connected to the output lines to maintain the gases within a defined pressure differential;

a water line connected to the first pressurized tank and the second pressurized tank for maintaining relative water levels in the tanks;

an electrolyzer maintained under pressure and receiving water from at least one of the pressurized tanks and producing hydrogen gas and oxygen gas for storage in the pressurized tanks; and a fuel cell for generating electrical energy and connected to the first output line and the second output line.

11. The regeneration system of claim 10 further comprising an accumulator connected to the output lines and having a movable diaphragm that separates the gases and moves to adjust volume to equalize pressure.

12. The regeneration system of claim 10 further comprising at least one circulating pump carried on the water line for maintaining relative water levels in the tanks.

13. The regeneration system of claim 10 wherein the water is adjusted between the pressure tanks by natural flow.

14. The regeneration system of claim 10 wherein the electrolyzer is retained in one of the pressurized tanks.

15. The regeneration system of claim 14 wherein the electrolyzer is retained in the first pressurized tank.

16. The regeneration system of claim 10 further comprises a third pressurized tank, the third pressurized tank containing a third gas and the electrolyzer, and the third pressurized tank is in pressure communication with one of the other pressurized tanks.

17. The regeneration system of claim 16 wherein the third gas is nitrogen.

18. The regeneration system of claim 16 wherein the pressure communication of the third pressurized tank with one of the other pressurized tanks is through an accumulator.

19. The regeneration system of claim 10 further comprising a catalyst hood overlying the electrolyzer for recombining with free oxygen to create water.

20. The regeneration system of claim 10 wherein both the electrolyzer and the fuel cell have a proton exchange membrane.

21. The regeneration system of claim 10 further comprising a solar array connected to the electrolyzer.

22. The regeneration system of claim 10 further comprising a wind power array.

23. A storage system for an electrolyzer comprising:

a pressurized tank for carrying water and hydrogen gas;

a second pressurized tank for carrying water and oxygen gas;

a first output line connected to the pressurized tank for carrying hydrogen gas from the tank;

a second output line connected to the second pressurized tank for carrying oxygen gas from the second tank;

a differential-pressure relief valve connected to the output lines to maintain the gases within a defined pressure differential;

a water line connected to the first pressurized tank and the second pressurized tank for maintaining relative water levels in the tanks;

a pressurized electrolyzer for inputting hydrogen gas and oxygen gas under pressure for storage in the pressurized tanks, the electrolyzer having an operating pressure in a range of 50 psig to 200 psig; and a fuel cell that receives hydrogen from the first tank and oxygen from the second tank.

24. The storage system of claim 23 further comprising an accumulator connected to the output lines and having a movable diaphragm that separates the gases and moves to adjust volume to equalize pressure.

25. The storage system of claim 23 further comprising at least one circulating pump carried on the water line for maintaining relative water levels in the tanks.

26. The storage system of claim 23 wherein the water is adjusted between the pressure tanks by natural flow.

* * * * *